Nov. 20, 1945.   L. S. FARRELL   2,389,189
PORTABLE FILTER
Filed July 21, 1943   3 Sheets-Sheet 1

LAWRENCE S. FARRELL
INVENTOR.

BY Edmund W. E. Kamm
ATTORNEY

Nov. 20, 1945.　　　L. S. FARRELL　　　2,389,189
PORTABLE FILTER
Filed July 21, 1943　　　3 Sheets-Sheet 3

LAWRENCE S. FARRELL
INVENTOR.

BY Edmund W.E. Kamm
ATTORNEY

Patented Nov. 20, 1945

2,389,189

UNITED STATES PATENT OFFICE 2,389,189

PORTABLE FILTER

Lawrence S. Farrell, Fort Wayne, Ind., assignor to S. F. Bowser & Company, Incorporated, Fort Wayne, Ind., a corporation of Indiana Application July 21, 1943, Serial No. 495,788

3 Claims. (Cl. 210—40)

This invention relates to a portable, powder type filter. More specifically, it relates to a filter which utilizes a coating of filter aid material upon a screen for removing solid and semi-solid material from a liquid, which has means for adding powder continuously to the screen to maintain a porous cake and which has means for adding a disinfecting material to the liquid to render it safe for drinking.

A great number of filters are disclosed in the prior art for filtering various liquids. Some filters utilize sand, gravel, diatomaceous earth, fuller's earth and other media for accomplishing the filtration.

Furthermore, it has been found that even if a large, heavy filter is installed in the field, conditions do not always make it possible to distribute the pure water to the men who require it. In addition, destruction of the single unit leaves a great many men without a source of water supply.

Accordingly it is an important object of the invention to produce a unit which is small enough and light enough to enable a man to carry it.

It is another object of the invention to produce a unit which is efficient so as to reduce to a minimum the amount of supplies needed to operate the device.

Still another object of the invention is to provide a unit which has built into it all of the equipment required to enable an operator to convert any reasonable source of water into a safe drinking water.

Yet another object of the invention is to provide a filter which can be operated with a minimum of personnel.

It is still another object of the invention to provide a unit which will have a relatively long cycle of operation.

Yet another object of the invention is to provide a filter having means for adding disinfecting materials to the water.

Another object of the invention is to provide a filter and means for continuously adding filter aid to the screen.

Still another object of the invention is to provide a filter which is simple and rugged.

These and other objects will become apparent from a study of the specification and the drawings which are attached thereto and which form a part thereof, and in which.

Figure 1:
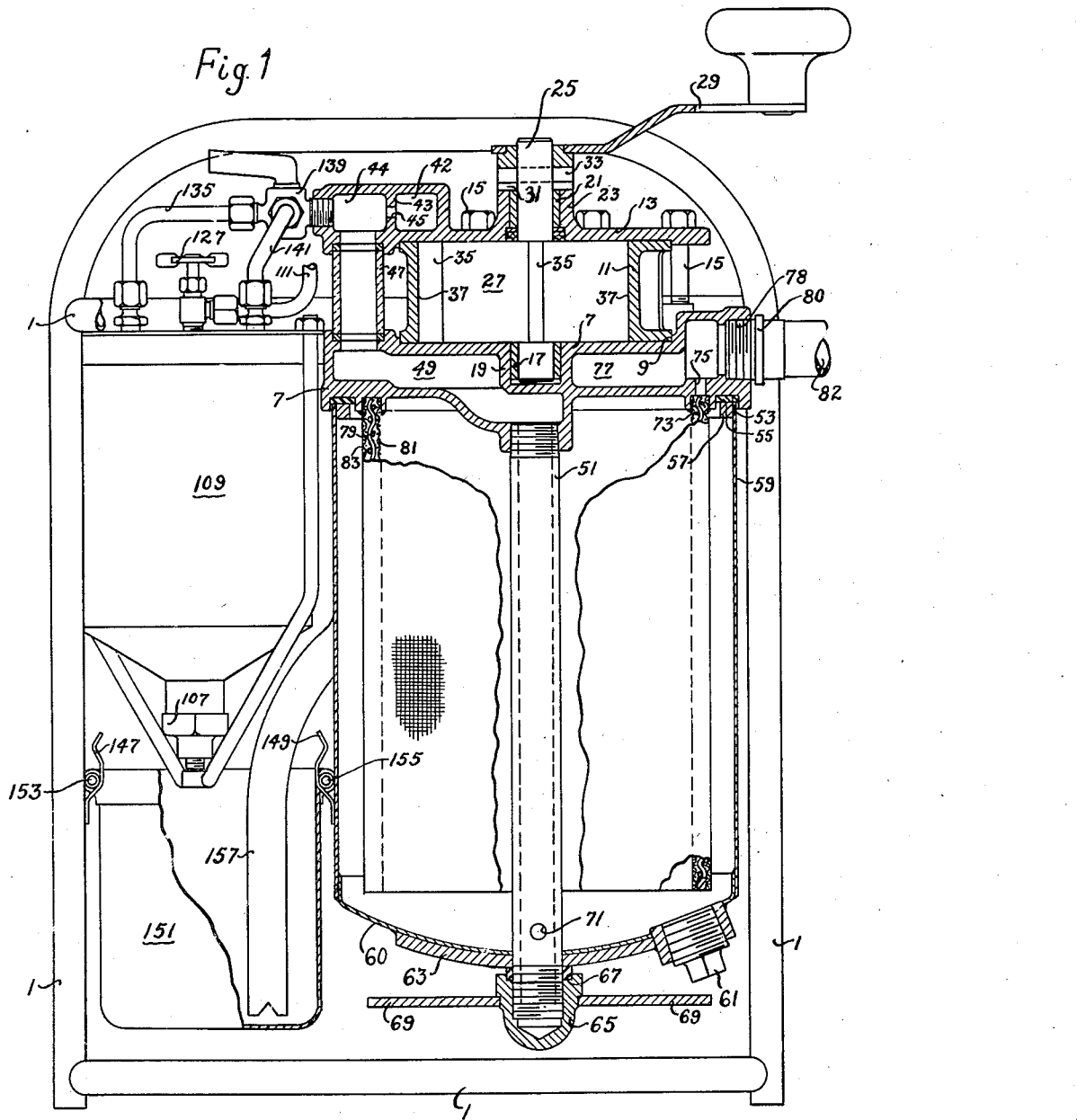
Figure 1 is a side elevation with parts broken away showing the pump, filter and a feed pot.
Figure 3:
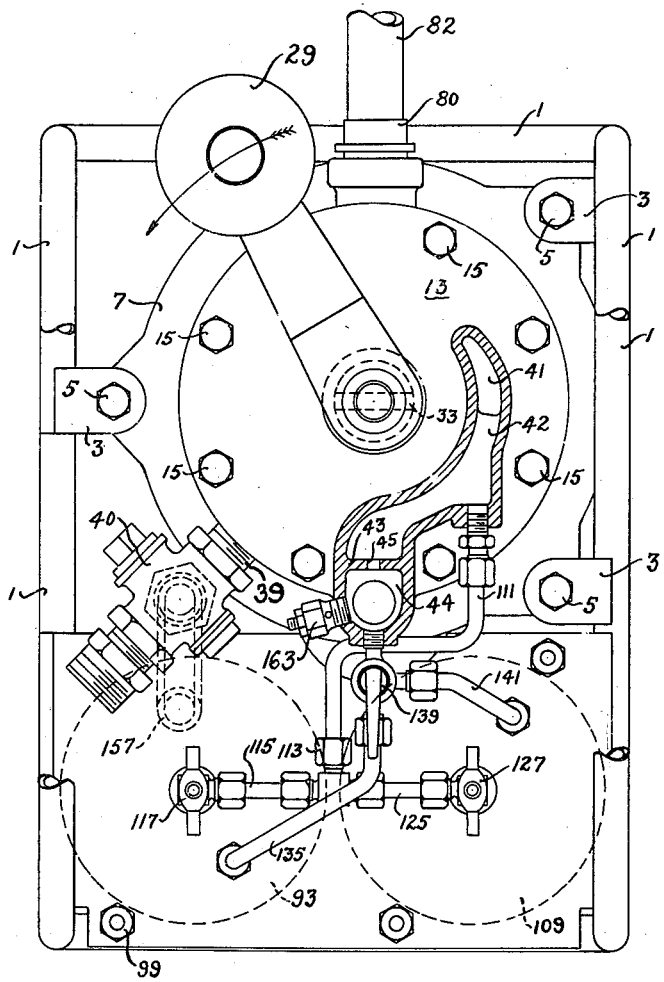
Figure 3 is a top view with parts broken away to show the orifice which effects feeding of material from the feed pots.

Referring now to Figures 1 and 3, the numeral 1 represents a number of tubular members which are welded together to form a frame. A plurality of supporting lugs 3 are welded on the frame and support by means of screws 5 and a head casting 7.

The head 7 is recessed at 9 to receive a pump body 11 and the body is provided with an end cap 13. Stud bolts 15 hold the cap and pump body in place on the head.

A bearing 17 is inserted in a recess 19 in head 7 and a bearing 21 is set in a boss 23 in the cap 13. A shaft 25 is journalled in these bearings and carries a rotor 27 within the pump body and a handle 29 on its outer end. The hub of the handle is notched at 31 to receive the key 33 which passes through the shaft. The handle is thus removable.

A plurality of blades 35 lie in slots in the rotor 27 and engage at their outer ends the bore 37 in the body 11. An inlet connection 39 enters the body and an outlet port 41 is formed in the cap 13. A three-way valve 40 is connected to port 39. A conduit 42—44 is cored in the cap and a transverse wall 43 in the conduit is provided with an orifice 45. A transparent tube 47 connects the conduit with a cored passage 49 in the head 7 which leads to a downwardly extending tube 51.

A circular recess 53 is formed on the lower side of the head to receive a gasket 55 and a ring 57 which is fixed to the upper edge of a tank 59. This tank has a bottom 60 which is perforated to permit the passage of the tube 51 through it. A plug 61 is provided at the bottom of the filter for draining the tank 59 or for filling it with sand in the event regular filter aid is not available. A reinforcement 63 is fixed to the bottom of the tank and the end of the pipe 51 is threaded to receive an acorn nut 65. The latter carries a gasket 67 which bears against the reinforcement to seal the joint. The nut is provided with projections 69 which enable the operator to compress the gaskets 55 and 67 to seal the joints.

The tube 51 is provided with openings 71 just above the bottom of the tank so that liquid issuing therefrom will stir up any powder which may drop down into the tank. The interior of the tank is preferably coated with a baked coating to prevent corrosion.

A second circular recess 73 is formed in the head 7 concentrically with the recess 53 and a plurality of ducts 75 connect the recess with the outlet channel 77. An outlet port 78 is adapted to receive a connection 80 for a hose 82.

A cylindrical screen which comprises two fine mesh outer screens 79, 81 and a coarse inner screen 83, is soldered in place in the recess 73. The lower end of the screen is closed by filling in the space between the ends of the outer screens with solder.

A plate 87 is welded to the frame 1 and carries two circular, flanged caps 89, 91. A feed pot 93 having an open but flanged top is adapted to enter cap 89 and bear against a gasket 95. A stirrup 97 is supported by nuts 99 on the plate 87 and carries an upwardly directed screw 101 which is disposed substantially coaxially under the feed pot. The latter has an axially directed cylindrical boss 103 which is received in a recess 105 in a nut 107 which is mounted on the screw 101.

The feed pot 109 is constructed and supported in a manner similar to pot 93.

A tube 111 is connected at one end to the conduit 42 which is between the pump discharge port 41 and the orifice 45 and is connected at the other end to a T fitting 113.

From one branch of the T a pipe 115 runs to a needle valve 117 and thence substantially along the axis of the feed pot 93 and terminates near the bottom thereof substantially at the level where the boss 103 begins. Two laterally directed orifices 119 and 121 and a downwardly directed orifice 123 are formed in the pipe.

The second branch of the T is connected to a pipe 125 which has a needle valve 127 and jets 129, 131 and 133.

A discharge tube 135 which is plugged at its lower end is provided with ports 137 adjacent the top of pot 93. This tube is connected by a three-way selector valve 139 with conduit 44 at a point between orifice 45 and the transparent tube 47.

A similar discharge tube 141 enters the pot 109, is provided with ports 143 and connects with valve 139.

Figure 2:
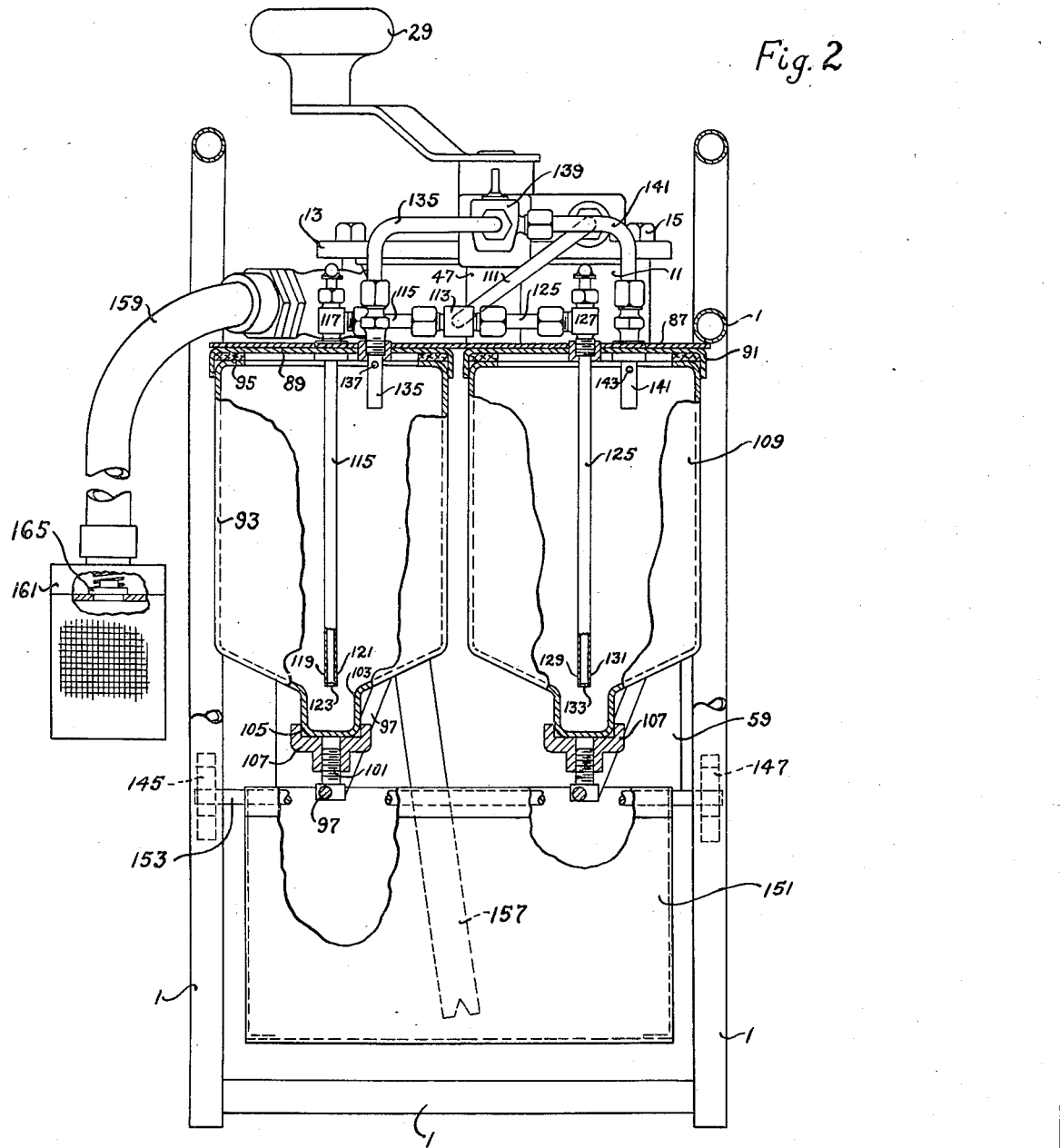
Figure 2 is a rear elevation with parts broken away to show the construction of the feed pots.

Fixed to the upright frame members and to the tank, as shown in Figures 1 and 2, are clips 145, 147 and 149. A waterproof bag 151 carries rods 153 and 155 on the two longitudinal edges and the rod 153 is held in clips 145 and 147 while rod 155 is held by clip 149.

A suction hose 157 is connected to one inlet port of the three-way valve 40 and the open end of the hose is disposed in the bag. A second suction hose 159 is attached at one end to the other inlet port of valve 40 and at the other end to a screen 161 which may be of any suitable construction. A check valve 165 is mounted in the screen and serves to prevent any back flow of liquid from the filter toward the screen which would tend to dislodge the filter cake from the screens.

Connected to the conduit 44 is a relief valve 163 which may be of any desired type. An adjustable type is preferred so that the maximum pressure on the filter may be varied if desired.

Operation

If we assume that it is desired to use the filter as a powder filter, the feed pot 93 is filled with a disinfectant solution such as calcium hypochlorite or sodium hypochlorite, or a powdered or fibrous material treated to give it oligodynamic properties, and clamped in place in the cap by means of the nut 107. There is of course nothing to prevent either or both pots from being used for that purpose. However, if the source of water to be used is very muddy the other feed pot is filled with a mixture of water and filter aid such as diatomaceous earth, activated carbon or other suitable material.

The bag 151 is partially filled with filter aid (about 3 ounces) and the discharge hose 82 is arranged to discharge into the bag 151.

The valve 40 is then set to draw water through the suction hose 159 and screen 161 which must be connected with the valve. Preferably, the hose 159 should be laid on a steady down grade to the screen so that no air pockets will form in it.

When this is accomplished, the selector valve 139 is set to draw from pot 93 and the needle valve 117 is opened about one turn. Thereafter, the crank handle 29 is turned and water will be drawn up into the pump and will be discharged into the filter through conduit 42, orifice 45, conduit 44, tube 47, conduit 49, tube 51 and openings 71. The filter will fill and water will pass through the screens 79, 81 and 83, ducts 75, channel 77, outlet 78 and by way of hose 82 to the bag 151.

When the bag is about two-thirds full, pumping is stopped and valve 40 is turned to draw the mixture of water and filter aid from the bag. This material is circulated until the water passing through the transparent tube 47 is crystal clear.

While the filter is being charged and precoated, the pressure in conduit 42 will be greater than that in 44 because of the orifice 45. This causes water to pass through tube 11, T 115, valve 117, ports 119, 121, and 123 into the bottom of feed pot 93 and the disinfectant solution will be forced through openings 137, tube 135, valve 139 into conduit 44 where it mixes with the raw water to kill any bacteria which may be contained therein.

As soon as the precoat is established and the water is clear, the valve 40 is turned to cut off the hose 157 and connect the raw water suction hose 159. This is preferably done without stopping the pump, because otherwise there is danger that the precoat dropping from the screen. The discharge hose 82 is then transferred to the pure water storage container such as a canteen and the effluent is safe drinking water.

The needle valve 117 is regulated to give the proper residual chlorine (if chlorine is used as the disinfectant). This chlorine residual is determined by the Orthotolodine test. Since the water entering the feed pot gradually dilutes the solution therein, it is necessary for an assistant operator to make the chlorine test at least every ten minutes and to regulate the valve 117 as it is shown to be required by the tests.

Figure 4:
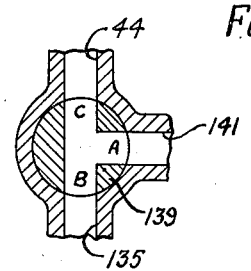
Figure 4 is a sectional view of the feed pot control valve.

The valve shown in Figure 4 will permit either or both feed pots to be drawn from or may be set to close off both pots.

In the position shown in this figure the port alignment is A—141, B—135 and C—44 so that both pots will feed the filter.

If the valve is rotated 90 degrees counter-clockwise the port alignment is A—44, B—141 so that pot 109 will be connected but pot 93 will be cut off.

If the valve is rotated 180 degrees from the Figure 4 position the port alignment will be B—44, C—135 and pot 93 will be connected while pot 109 will be cut off.

If the valve is rotated 270 degrees counterclockwise or 90 degrees clockwise, the port alignment will be A—135, C—141 and neither pot will be connected to the filter.

Assuming that the water is muddy, it is desirable to add a continuous supply of filter aid and a carbon mixture from feed pot 109 at the same time that the disinfectant is being added. This is done by adjusting the valve 127. The operator readily learns to judge the proper opening of the valve in relation to the turbidity of the water as observed in the transparent tube.

The addition of filter aid lengthens the filtration cycle because it maintains the cake porous. The end of the cycle is reached when water is discharged from the relief valve and this valve is preferably set to open when the pressure reaches about 20 p. s. i.

The construction of the orifices at the bottom of the tubes 115 and 125 is such that the incoming water will issue in jets which create a turbulence and keep the powder or other solids which might otherwise settle out, in suspension in the water.

To clean the filter it is necessary only to remove the nut 65 and drop the tank 59. The sludge may then be cleaned from the screens with a stick or a piece of metal and the tank can be washed or swabbed out. Cleaning of the pots is accomplished by loosening the nuts 107 and removing the pots from their associated caps and scraping and/or washing them.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a light weight portable liquid filtering apparatus, the combination of a tubular frame, a pump body mounted on said frame, a pump inlet, a pump discharge passage in said body, a filtrate outlet, a double faced filter screen suspended from said body and having its interior connected and communicating with said filtrate outlet, and a filter tank removably mounted upon said body, surrounding said screen and communicating with said pump outlet, said filter screen being in the form of a hollow cylinder and having filtering surfaces on both inside and outside.

2. In a light weight portable liquid filtering apparatus, the combination of a tubular frame, a pump body mounted on said frame, a pump inlet, a pump discharge passage in said body, a filtrate outlet in said body, a double faced filter screen suspended from said body and having its interior connected and communicating with said filtrate outlet, a filter tank removably mounted upon said body, surrounding said screen and communicating with said pump outlet, said filter screen being in the form of a hollow cylinder and having filtering surfaces on both inside and outside, and a plug in said tank adjacent the lower end of said screen and extending laterally beyond each of the filtering surfaces.

3. In a liquid filtering and disinfecting apparatus, the combination of a filter having a dual surfaced filtering element with a filtrate channel between said surfaces, a pump having an inlet connected to a supply source, a conduit connecting said filter and pump and having a flow restricting device therein, feed pots for disinfectant and filter aid, means connecting said pump with said pots and said feed pots with the conduit and device to discharge disinfectant and filter aid from said feed pots into said filter, a container for precoating slurry, means for circulating said slurry through the pump and filter to establish a precoat on surfaces of said filtering element, a sight glass in said conduit for determining the precoating cycle, a raw liquid supply line, a means for connecting said pump inlet at will to either the supply line or said container.

LAWRENCE S. FARRELL.